US009264108B2

(12) United States Patent
Von Novak, III (10) Patent No.: US 9,264,108 B2
(45) Date of Patent: Feb. 16, 2016

(54) WIRELESS POWER CARRIER-SYNCHRONOUS COMMUNICATION

(75) Inventor: William H. Von Novak, III, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 734 days.

(21) Appl. No.: 13/584,477

(22) Filed: Aug. 13, 2012

(65) Prior Publication Data

US 2013/0099584 A1 Apr. 25, 2013

Related U.S. Application Data (60) Provisional application No. 61/550,281, filed on Oct. 21, 2011.

(51) Int. Cl.
*H02J 17/00* (2006.01)
*H04B 5/00* (2006.01)
*H02J 7/02* (2006.01)
*H02J 7/00* (2006.01)

(52) U.S. Cl.
CPC ............... *H04B 5/0037* (2013.01); *H02J 7/025* (2013.01); *H02J 2007/0096* (2013.01); *H04B 5/0031* (2013.01); *H04B 5/0081* (2013.01)

(58) Field of Classification Search
CPC ........... H02J 5/005; H02J 7/025; H02J 17/00; H02J 2007/0096; H01F 38/14; B60L 11/182; H04B 5/0037; H04B 5/0031; H04B 5/0081
USPC ........................................................ 307/104
See application file for complete search history.

(56) References Cited

U.S. PATENT DOCUMENTS

| | | | |
|---|---|---|---|
| 4,475,209 A * | 10/1984 | Udren | 375/214 |
| 5,302,954 A | 4/1994 | Brooks et al. | |
| 5,940,447 A | 8/1999 | Connell et al. | |
| 6,194,993 B1 | 2/2001 | Hayashi et al. | |
| 6,353,636 B1 * | 3/2002 | Tate et al. | 375/260 |
| 7,097,619 B2 | 8/2006 | Von Behren et al. | |
| 7,164,344 B2 | 1/2007 | Deguchi et al. | |

(Continued)

FOREIGN PATENT DOCUMENTS

| | | |
|---|---|---|
| CN | 1912786 A | 2/2007 |
| DE | 19542214 C1 | 3/1997 |

(Continued)

OTHER PUBLICATIONS

Liu et al., "Implantable Biomimetic Microelectronic Systems Design", Engineering in Medicine and Biology Magazine, IEEE, Issue Date: Sep.-Oct. 2005, pp. 66-74, vol. 24 Issue: 5.

(Continued)

*Primary Examiner* — Thienvu Tran
*Assistant Examiner* — Brian K Baxter
(74) *Attorney, Agent, or Firm* — Knobbe Martens Olson & Bear LLP (57) ABSTRACT

An apparatus and method for communication with a wireless power transmitter are disclosed. According to one aspect, a device may include an antenna for wirelessly transmitting a power signal at a power carrier and data signal at a data signal carrier. A receiver may be configured to receive the power signal and the data signal and determine a reference signal based on the received signal.

20 Claims, 9 Drawing Sheets

(56) References Cited

U.S. PATENT DOCUMENTS

| | | |
|---|---|---|
| 7,627,288 B2 | 12/2009 | Iida |
| 2007/0021140 A1 | 1/2007 | Keyes et al. |
| 2007/0135056 A1* | 6/2007 | Kremer et al. ............. 455/67.11 |
| 2008/0076351 A1 | 3/2008 | Washiro |
| 2008/0227478 A1 | 9/2008 | Greene et al. |
| 2008/0242232 A1* | 10/2008 | Zavadsky et al. .......... 455/67.11 |
| 2009/0067208 A1 | 3/2009 | Martin et al. |
| 2009/0322285 A1 | 12/2009 | Hautanen |
| 2010/0127660 A1 | 5/2010 | Cook et al. |
| 2010/0190436 A1 | 7/2010 | Cook et al. |
| 2010/0277120 A1 | 11/2010 | Cook et al. |
| 2011/0018358 A1 | 1/2011 | Kozakai |
| 2011/0130093 A1 | 6/2011 | Walley et al. |
| 2011/0204711 A1 | 8/2011 | Norconk et al. |
| 2012/0155344 A1 | 6/2012 | Wiley et al. |

FOREIGN PATENT DOCUMENTS

| | | |
|---|---|---|
| EP | 0015754 A1 | 9/1980 |
| EP | 2348600 A2 | 7/2011 |
| GB | 1543910 A | 4/1979 |
| GB | 2472700 A | 2/2011 |
| JP | H10107680 A | 4/1998 |
| JP | 2010021684 A | 1/2010 |
| JP | 2011154435 A | 8/2011 |
| KR | 20100054846 A | 5/2010 |
| WO | WO9836507 A1 | 8/1998 |
| WO | WO2010012035 A1 | 2/2010 |
| WO | WO-2010030005 A1 | 3/2010 |
| WO | WO2010119772 A1 | 10/2010 |
| WO | WO2011036702 A1 | 3/2011 |
| WO | WO2012037279 A1 | 3/2012 |

OTHER PUBLICATIONS

Wiley et al., "Out-of-band communication on harmonics of the primary carrier in a wireless power system," U.S. Appl. No. 13/213,005, filed Aug. 18, 2011, 31 pgs.

International Search Report and Written Opinion—PCT/US2012/060645—ISA/EPO—Jan. 30, 2013.

* cited by examiner

WIRELESS POWER CARRIER-SYNCHRONOUS COMMUNICATION

RELATED APPLICATIONS

This application claims priority benefit under 35 U.S.C. §119(e) to: U.S. Provisional Patent Application 61/550,281 entitled "WIRELESS POWER CARRIER-SYNCHRONOUS COMMUNICATION" filed on Oct. 21, 2011, the disclosure of which is hereby incorporated by reference in its entirety.

FIELD

The disclosure is directed to methods and systems for communication between a wireless power transmitter a wireless power receiver.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless power transmitter apparatus. The wireless power transmitter apparatus includes a power source configured to generate a signal at a first frequency. The wireless power transmitter apparatus further includes a controller configured to receive information indicative of power level limits at a plurality of frequencies, and select a multiplication factor based on the power level limits. The wireless power transmitter apparatus further includes a communication signal generator coupled to the power source and configured to receive the signal at the first frequency and generate a communication signal at a second frequency based on the selected multiplication factor. The wireless power transmitter apparatus further includes a driver coupled to the power source and configured to receive the signal at the first frequency and generate a driving signal at the first frequency, the driving signal being substantially in phase with the communication signal. The wireless power transmitter apparatus further includes a transmit circuit configured to receive a combined signal including the communication signal and the driving signal to generate a wireless field.

Another aspect of the subject matter described in the disclosure provides a method of transferring power via a wireless field comprising. The method includes generating a signal at a first frequency. The method further includes receiving information indicative of power level limits at a plurality of frequencies. The method further includes selecting a multiplication factor based on the power level limits. The method further includes generating a communication signal at a second frequency based on the selected multiplication factor. The method further includes generating a driving signal at the first frequency, the driving signal being substantially in phase with the communication signal. The method further includes generating the wireless field based on a combined signal including the communication signal and the driving signal.

Another aspect of the subject matter described in the disclosure provides an apparatus for transferring power via a wireless field. This apparatus includes means for generating a signal at a first frequency. This apparatus further includes means for receiving information indicative of power level limits at a plurality of frequencies. This apparatus further includes means for selecting a multiplication factor based on the power level limits. This apparatus further includes means for generating a communication signal at a second frequency based on the selected multiplication factor. This apparatus further includes means for generating a driving signal at the first frequency, the driving signal being substantially in phase with the communication signal. This apparatus further includes means for generating a wireless field based on a combined signal including the communication signal and the driving signal.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer. The power output level and transfer efficiency are sufficient to charge a load (such as a rechargeable battery, or the like) of a receiving device.

Figure 1:
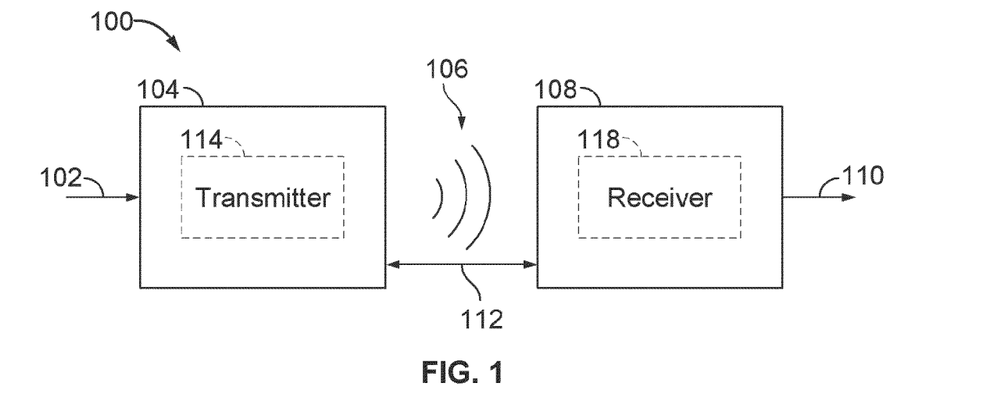
FIG. 1 is a functional block diagram of an exemplary wireless power transfer system, in accordance with implementations of the invention.

FIG. 1 is a functional block diagram of an exemplary wireless power transfer system 100, in accordance with exemplary implementations of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary implementation, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit antenna 114 for outputting an energy transmission. The receiver 108 further includes a receive antenna 118 for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. The transmit and receive antennas 114 and 118 are sized according to applications and devices to be associated therewith. As described above, efficient energy transfer may occur by coupling a large portion of the energy in a field 105 of the transmit antenna 114 to a receive antenna 118 rather than propagating most of the energy in an electromagnetic wave to the far field. When positioned within the field 105, a "coupling mode" may be developed between the transmit antenna 114 and the receive antenna 118. The area around the transmit and receive antennas 114 and 118 where this coupling may occur is referred to herein as a coupling-mode region.

Figure 2:
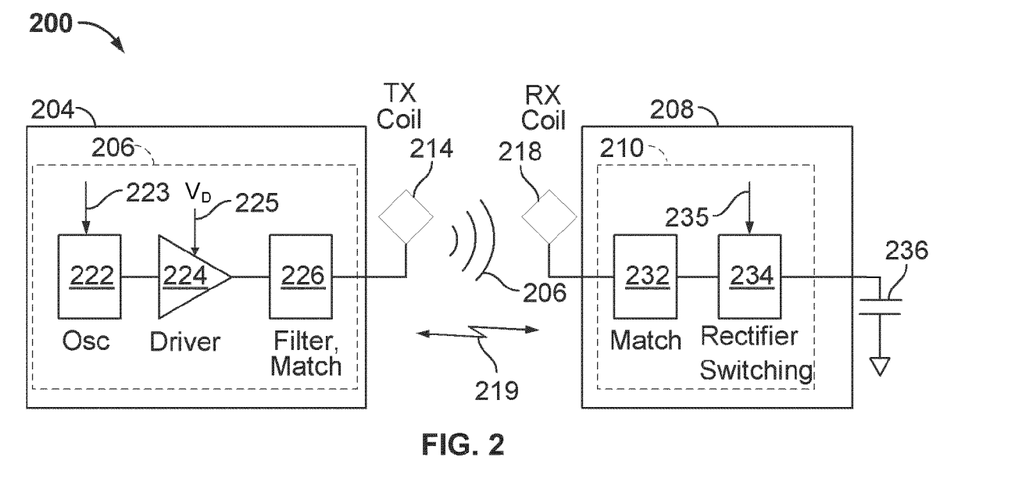
FIG. 2 is a functional block diagram of exemplary components that may be used in the wireless power transfer system of FIG. 1, in accordance with various implementations of the invention.

FIG. 2 is a functional block diagram of exemplary components that may be used in the wireless power transfer system 100 of FIG. 1, in accordance with various exemplary implementations of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit antenna 214.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive antenna 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described in greater detail below, receiver 208, which may initially have an associated load (e.g., battery 236) may be configured to determine whether an amount of power transmitted by transmitter 204 and receiver by receiver 208 is appropriate for charging the battery 236. The load (e.g., battery 236) may be configured to be selectively coupled to the receiver 208. Receiver 208 may be configured to enable the load (e.g., battery 236) upon determining that the amount of power is appropriate. In some implementations, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
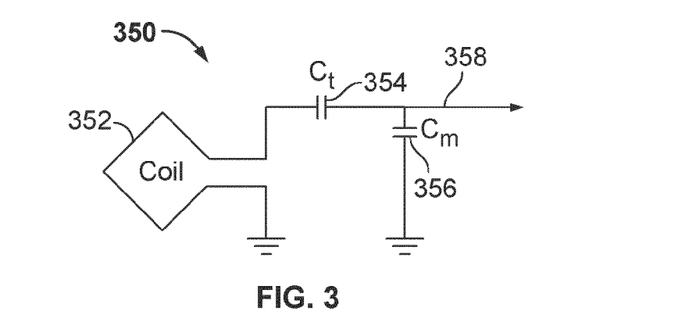
FIG. 3 is a schematic diagram of a portion of transmit circuitry or receive circuitry of FIG. 2 including a transmit or receive antenna, in accordance with implementations of the invention.

FIG. 3 is a schematic diagram of a portion of transmit circuitry 206 or receive circuitry 210 of FIG. 2 including a transmit or receive antenna 352, in accordance with exemplary implementations of the invention. As illustrated in FIG. 3, transmit or receive circuitry 350 used in exemplary implementations may include a coil 352. The coil 352 may also be referred to or be configured as a "loop" antenna 352. The coil 352 may also be referred to herein or be configured as a "magnetic" antenna or an induction coil. The term "coil" is intended to refer to a component that may wirelessly output or receive energy for coupling to another "coil." The coil may also be referred to as an "antenna" of a type that is configured to wirelessly output or receive power. The coil 352 may be configured to include an air core or a physical core such as a ferrite core (not shown). Air core loop coils may be more tolerable to extraneous physical devices placed in the vicinity of the core. Furthermore, an air core loop coil 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmitting antenna to the receiving antenna residing in a region where this field 105 is established rather than propagating the energy from the transmitting antenna into free space.

The resonant frequency of the loop or magnetic antennas is based on the inductance and capacitance. Inductance may be simply the inductance created by the coil 352, whereas, capacitance may be added to the coil's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter coils, the size of capacitance needed to sustain resonance may decrease as the diameter or inductance of the loop increases. Furthermore, as the diameter of the coil increases, the efficient energy transfer area of the near-field may increase. Other resonant circuits formed using other components are also possible. As another non-limiting example, a capacitor may be placed in parallel between the two terminals of the antenna 350. For transmit antennas, a signal 358 with a frequency that substantially corresponds to the resonant frequency of the coil 352 may be an input to the coil 352.

In one implementation, the transmitter 104 may be configured to output a time varying magnetic field with a frequency corresponding to the resonant frequency of the transmit antenna 114. When the receiver is within the field 105, the time varying magnetic field may induce a current in the receive antenna 118. As described above, if the receive antenna 118 is configured to be resonant at the frequency of the transmit antenna 118, energy may be efficiently transferred. The AC signal induced in the receive antenna 118 may be rectified as described above to produce a DC signal that may be provided to charge or to power a load.

Figure 4:
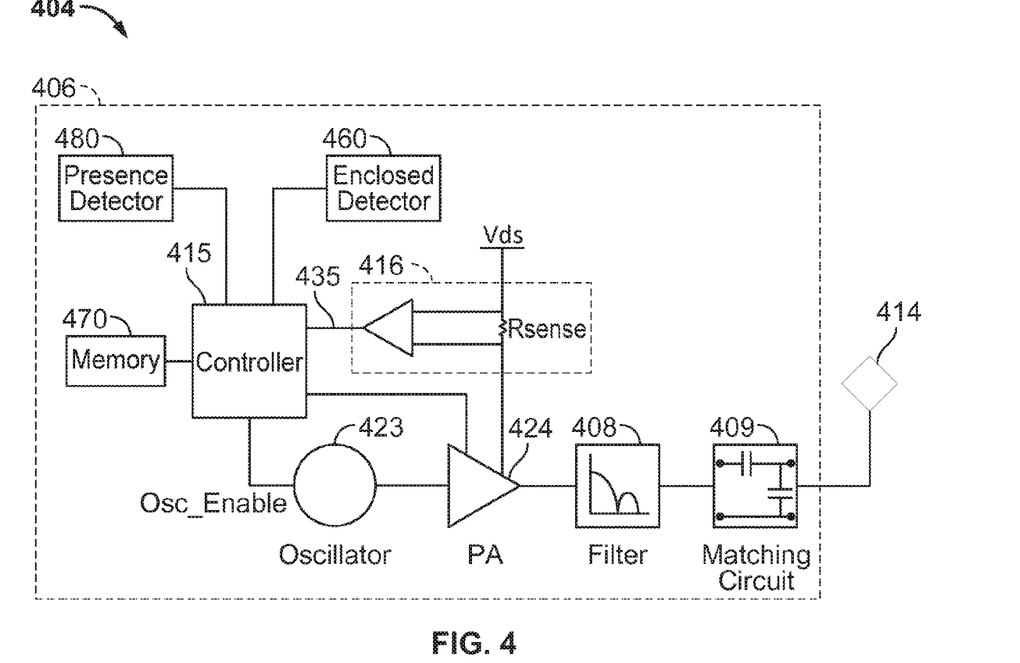
FIG. 4 is a functional block diagram of a transmitter that may be used in the wireless power transfer system of FIG. 1, in accordance with implementations of the invention.

FIG. 4 is a functional block diagram of a transmitter 404 that may be used in the wireless power transfer system of FIG. 1, in accordance with exemplary implementations of the invention. The transmitter 404 may include transmit circuitry 406 and a transmit antenna 414. The transmit antenna 414 may be the coil 352 as shown in FIG. 3. Transmit circuitry 406 may provide RF power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 13.56 MHz ISM band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent self-jamming of devices coupled to receivers 108 (FIG. 1). Other exemplary implementations may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit antenna 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out-of-band emissions, especially when transitioning from one frequency to another.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low. In a one implementation, the transmit antenna 414 may generally be configured for association with a larger structure such as a table, mat, lamp or other less portable configuration. Accordingly, the transmit antenna 414 generally may not need "turns" in order to be of a practical dimension. An exemplary implementation of a transmit antenna 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the RX device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary implementations, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the electromagnetic field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary implementations, a method by which the transmitter 404 does not remain on indefinitely may be used. In this case, the transmitter 404 may be programmed to shut off after a user-determined amount of time. This feature prevents the transmitter 404, notably the driver circuit 424, from continuing to operate after the wireless devices in its perimeter are fully charged. This event may be due to the failure of the circuit to detect the signal sent from either the repeater or the receive antenna that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
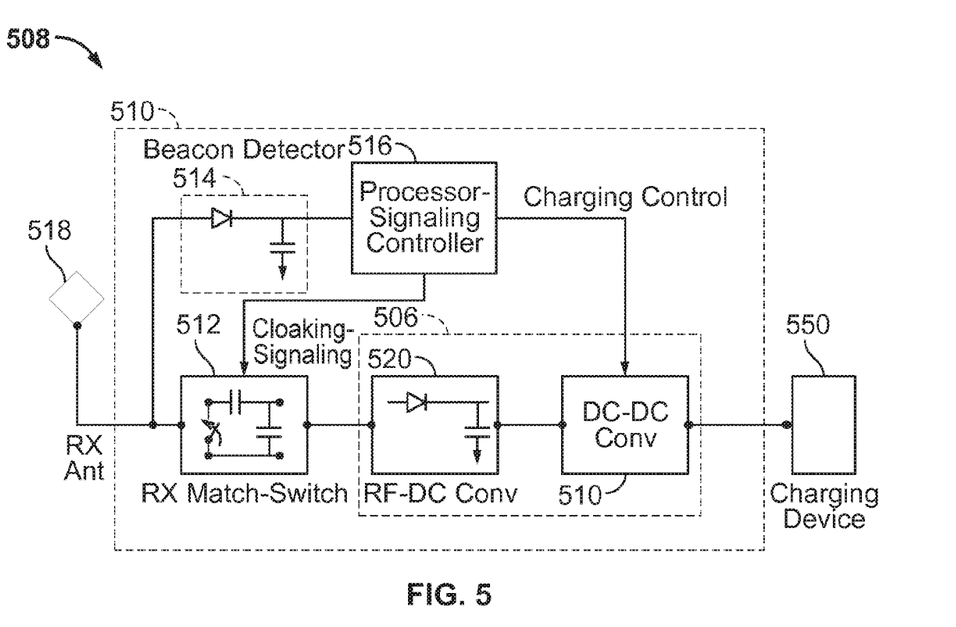
FIG. 5 is a functional block diagram of a receiver that may be used in the wireless power transfer system of FIG. 1, in accordance with implementations of the invention.

FIG. 5 is a functional block diagram of a receiver 508 that may be used in the wireless power transfer system of FIG. 1, in accordance with exemplary implementations of the invention. The receiver 508 includes receive circuitry 510 that may include a receive antenna 518. Receiver 508 further couples to device 550 for providing received power thereto. It should be noted that receiver 508 is illustrated as being external to device 550 but may be integrated into device 550. Energy may be propagated wirelessly to receive antenna 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated device 550. By way of example, device 550 may be a portable electronic device having diametric or length dimension smaller that the diameter of length of transmit antenna 414. In such an example, receive antenna 518 may be implemented as a multi-turn antenna in order to reduce the capacitance value of a tuning capacitor (not shown) and increase the receive antenna's impedance. By way of example, receive antenna 518 may be placed around the substantial circumference of device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive antenna 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary implementation, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive antenna 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
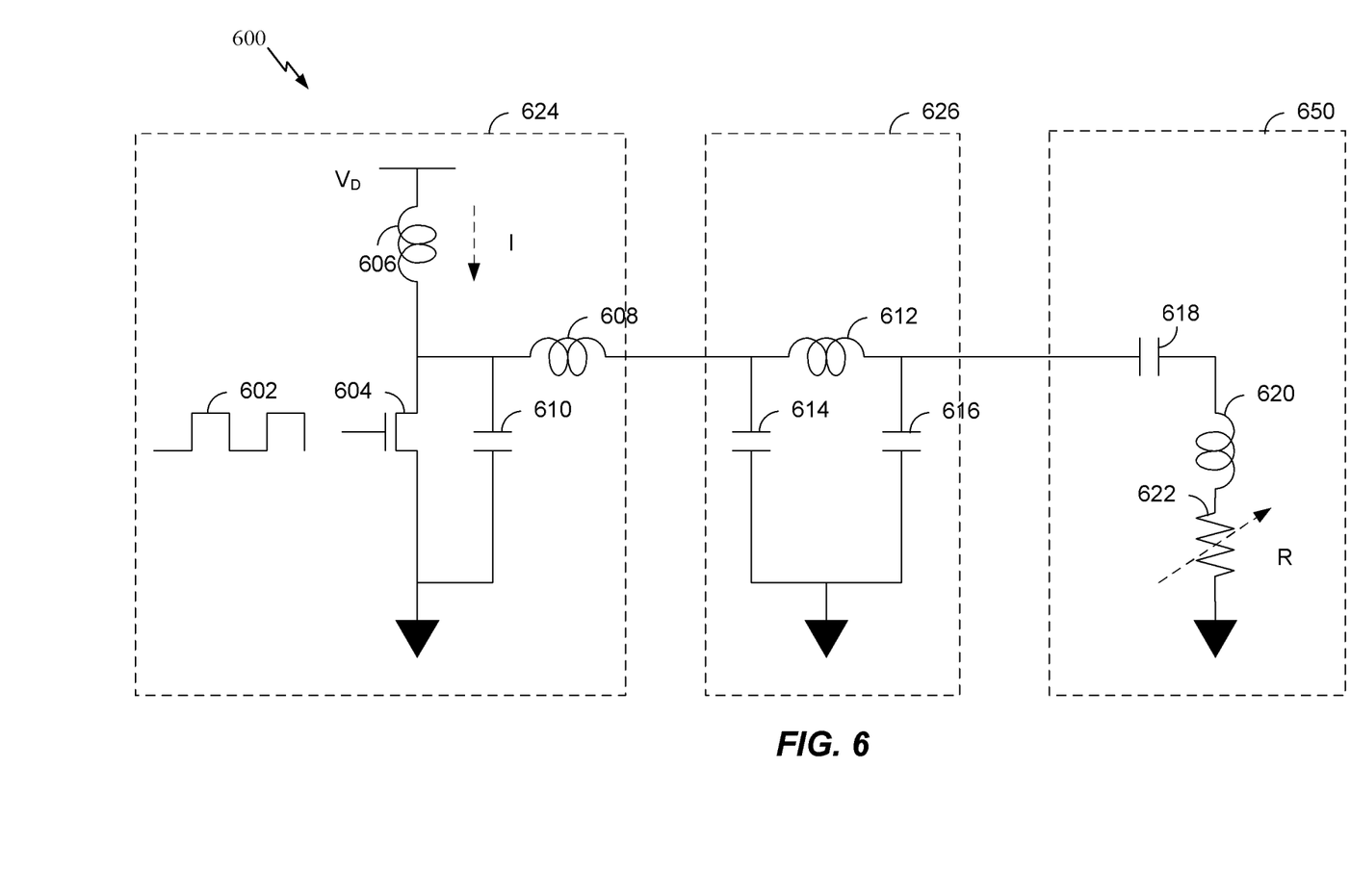
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 406 of FIG. 4. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier, however, any suitable driver circuit 624 may be used in accordance with implementations of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising an antenna 614. The transmit circuit 650 may include a series resonant circuit having a capacitance 620 and inductance (e.g., that may be due to the inductance or capacitance of the coil or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

Wireless power systems may require communication systems to control and coordinate power transfer. For example, communication between a wireless power transmitter and wireless power receivers may be used to control power levels and facilitate control of how much power is being delivered to the wireless power receivers. As discussed above, communication may be performed in-band, via modulation of the power signal, or out-of-band, via data transmission on a different frequency.

If out of band signaling is utilized, there are several modulation schemes that can be used. These modulation schemes can include, for example, phase-shift keying (PSK), frequency-shift keying (FSK), amplitude-shift keying (ASK), quadrature amplitude modulation (QAM), or the like. For phase modulation methods, recovery of phase information may be complicated by the requirement to generate an accurate local frequency to compare to the received signal in order to extract data that is transmitted in a phase modulated signal. Transmission of data signals simultaneously by a plurality of devices may also be negatively affected by inadvertent interference which may occur due to the lack of an accurate reference signal. For example, the lack of an accurate phase reference may result in constructive or destructive interference between signals that are communicated by different devices; thereby potentially corrupting the data that is transmitted by each of the devices.

Figure 7:
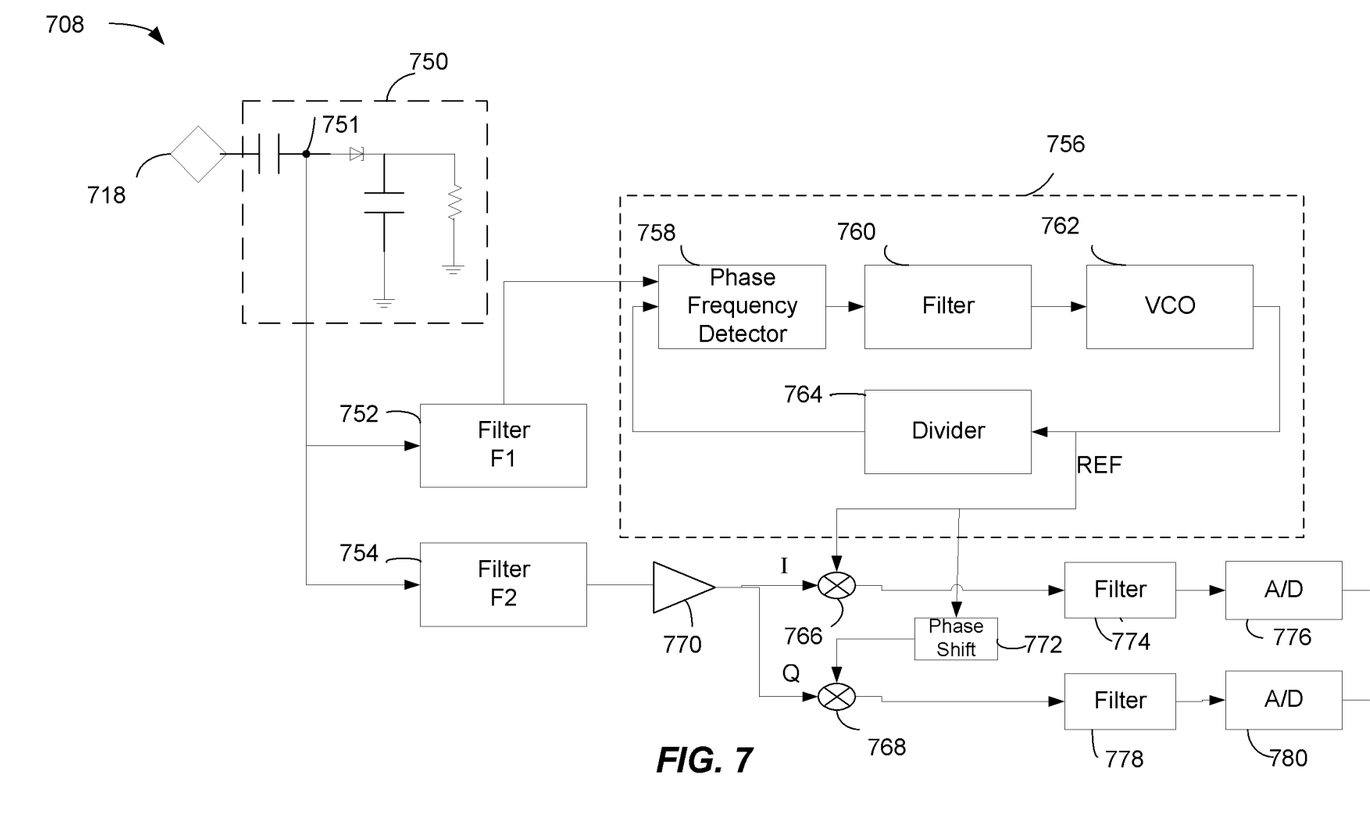
FIG. 7 is a simplified block diagram of a receiver system according to a comparative example.

FIG. 7 is a simplified block diagram of a receiver system 708 according to a comparative example. As shown in FIG. 7, the receiver system 708 may be configured to demodulate a signal that is modulated using a quadrature amplitude modulation (QAM) method. In the system of FIG. 7, a power carrier at a first frequency F1 (e.g., 6.78 MHz) is utilized for power transmission, and a communication signal carrier at a second frequency F2 (e.g., 40.68 MHz) is utilized for data transmission. The system includes a resonant tank circuit 750 connected to a receive antenna 718. A tap terminal 751 is connected to the resonant tank circuit 750 and to a first and second filter 752, 754. The first filter 752 may be configured as a carrier signal filter (e.g., a bandpass filter). The first filter 752 may pass signals only at the first frequency F1 (e.g., 6.78 MHz). The second filter 754 may be configured as a data signal filter 754 (e.g., another bandpass filter). The second filter 754 may be configured to pass a signal only at the second frequency F2 (e.g., 40.68 MHz). In some implementations, the first filter 752 (e.g., the power signal carrier filter) may not be included, and the second filter 754 (e.g., the data signal carrier filter) may include additional filtering components in order to remove the power carrier.

The output of the first filter 752 (e.g., the 6.78 MHz power carrier) may be connected to a standard PLL circuit 756 that locks to the power carrier frequency and generates a phase-stable reference at the second frequency F2 (e.g., 40.68 MHz). For example, as illustrated, the PLL circuit 756 includes a phase frequency detector 758, a PLL filter 760, a voltage controlled oscillator 762, and a divider 764. The PLL circuit 756 may also include other components (e.g., a charge pump) that are not illustrated.

The reference signal (REF) at the second frequency F2 (e.g., 40.68 MHz) may then be fed to two multipliers 766 and 768. The first multiplier 766 receives the received data signal from the data signal filter 754 through a data signal amplifier 770. The first multiplier 766 also receives the reference signal (e.g., at 40.68 MHz). The second multiplier 768 receives the received data signal from the data signal filter 754 through the data signal amplifier 770, and the reference frequency signal through a phase shift circuit 772. The phase shift circuit 772 may be configured to delay the reference frequency signal by, for example, 90 degrees. The output of the first multiplier 766 may be processed by a first output filter 774, and a first A/D converter 776, while the output of the second multiplier 768 may be processed by a second output filter 778 and a second A/D converter 780. The resulting configuration may behave as an I-Q detector.

As illustrated in FIG. 7, the receiver system 708 includes a phase locked loop circuit 756 in order to calculate a local reference having limited accuracy for demodulation. A phase shift keying receiver may also require additional circuitry for zero phase recovery. In a phase shift keying receiver, phase-shift balancing or phase reference schemes may be used to generate an average zero phase reference to be utilized as a local reference for the "zero phase." The resulting received constellation is then compared to this (limited accuracy) phase reference.

According to some implementations, a system and method are disclosed which acquire an accurate phase reference signal. The systems described herein may be capable of generating an accurate phase reference, and therefore do not necessarily require the above described phase determination schemes.

Figure 8:
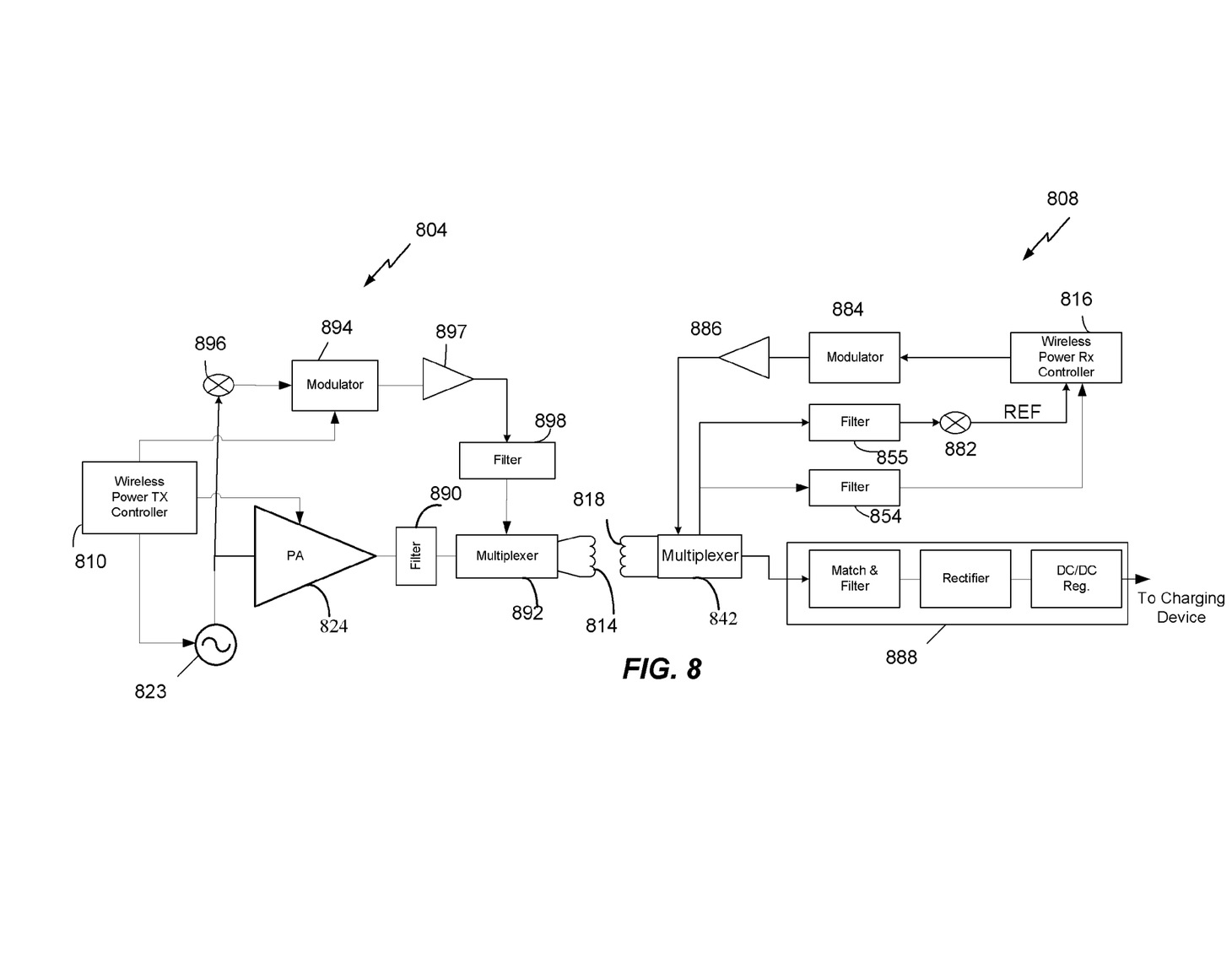
FIG. 8 is a simplified block diagram of a wireless power system, in accordance with some implementations.

FIG. 8 is a simplified block diagram of a wireless power system according to some implementations. As shown in FIG. 8, the wireless power system includes a wireless power transmitter 804 including an oscillator 823, and a driver circuit 824 (e.g., a power amplifier) configured to generate a wireless power carrier signal. The wireless power carrier signal is transmitted through a carrier signal filter 890 to a transmitter multiplexer 892 and is used to drive the transmit antenna 814 to transmit a signal through a wireless field to a wireless power receiver 808. The wireless power transmitter 804 also includes a wireless power TX controller 810 that is configured to control operation of the components of the wireless power transmitter 804. As illustrated, the wireless power TX controller 810 is configured to send control signals to the oscillator 823, and the driver circuit 824 to control the wireless power transfer field generated by the wireless power transmitter 804. Further, the wireless power TX controller 810 is configured to generate a data signal for communication of information to a wireless power receiver 808. For example, the wireless power TX controller 810 may be configured to generate a data signal that is received at the input of a modulator 894. The modulator 894 may also be configured to receive a communication signal carrier frequency signal from the output of a multiplier 896. The multiplier 896 may be configured to receive the frequency signal at the output of the oscillator 823, and multiple the frequency signal by a multiplication factor. For example, an oscillator 823 may generate a frequency signal at a first frequency F1 (e.g., 6.78 MHz). The multiplier may multiple the frequency F1 by a multiplication factor M (e.g., M=6) to generate a data signal carrier frequency F2 (e.g., 40.68 MHz). The data signal carrier F2 may be utilized by the modulator 894 to generate the data signal for transmission. The output of the modulator 894 may be coupled to the transmitter multiplexer 892 through a data signal amplifier 897 and a data signal filter 898. The transmitter multiplexer 892 may be configured to transmit the data signal at the data signal carrier frequency along with the power signal at the power signal carrier frequency through the transmit antenna 814.

As illustrated, the data signal carrier frequency F2 is a multiple of the power signal carrier frequency F1, and as a result, the frequency signals F1 and F2 are in-phase with each other. The selection of the multiplication factor M may be based on applicable standards regarding signal strength levels at different frequencies. For example, the TX controller 810 may be configured to receive information indicative of particular limits and different frequencies. Based on the received information regarding the limits, the TX controller 810 may be configured to select the frequencies F1 and F2 such that the power signal carrier frequency F1 and harmonics thereof do not constructively interfere with the data signal carrier frequency F2 and harmonics thereof to exceed the limits in any frequency band. For example, in some implementations, a power signal includes harmonics that are at multiples of the power signal carrier frequency since the power signal may not be a pure sinusoidal wave. The harmonics may also be static (e.g., located at the same frequency multiple of the power carrier) or they may change due to variations in operating conditions (e.g., receiver placement, transmitter power level, or the like). A data carrier that corresponds to a harmonic of the power signal may constructively interfere with the harmonic if the data signal and the harmonic are in phase. As a result, the total energy at the harmonic/data signal frequency may increase due to constructive interference. However, since the total energy is the sum of the data signal and the power signal harmonic, no additional energy associated with the data carrier will be present as a result of the constructive interference. As a result, little benefit is provided to the system for communicating the data signal from the increased energy caused by the constructive interference. However, the increased energy may result in the system exceeding emissions limits at the frequency corresponding to the harmonic and the data signal.

In some implementations, a multiplication factor may be selected such that the interference between the data signal and the harmonics of the power signal do not exceed defined (e.g., regulatory) limits. For example, a multiplication factor may be selected to avoid particular frequencies which have lower defined limits and/or that are located relatively close to the power signal carrier. In some implementations, a multiplication factor may be selected and a phase of the corresponding harmonic of the power signal may be determined. The data carrier may be generated at a phase that is 180 degrees out of phase of a corresponding power signal carrier harmonic in order to remain below the defined limit at the corresponding frequency of the harmonic and the data carrier. In some implementations, the multiplication factor may be predetermined and set during operation of the wireless power transmitter. In other implementations, the multiplication factor may be dynamically varied during operation. For example, the multiplication factor may be dynamically varied based on feedback regarding the phases and energy levels of the power signal harmonics. In some implementations, the multiplication factor may be dynamically varied in order to encode additional information for transmission to a wireless power receiver and/or to increase throughput of the data signal.

FIG. 8 also illustrates a wireless power receiver 808 in communication with the wireless power transmitter 804. As illustrated, the wireless power receiver 808 may include a receive antenna 818 for receiving signals via a wireless field generated by the wireless power transmitter 804. The received signal may include a data signal at a communication signal carrier frequency F2 and a power signal at a power signal carrier frequency F1. The output of the receive antenna 818 may be coupled to a receiver multiplexer 842. The receiver multiplexer 842 may be configured to output the data signal and the power signal from the received signal. As illustrated, a first output of the receiver multiplexer 842 may be coupled to wireless power receive circuitry 888, including various components such as a filter, a load adjustment circuit, rectifier, and a regulator, for generating a signal to transfer power to a charging device. The output of the receiver multiplexer 842 may also be provided to a data signal filter 854 and a reference signal filter 855. The data signal filter 854 (e.g., a bandpass filter) may be configured to filter the received signal and output a signal at the data signal carrier frequency F2 (e.g., 40.68 MHz). The reference signal filter 855 (e.g., a bandpass filter) may be configured to filter the received signal and output a signal corresponding to the power signal carrier frequency F1 (e.g., 6.78 MHz). The output of the reference signal filter 855 may be received by a multiplier 882 and multiplied by a multiplication factor M (e.g., M=6) to generate a reference signal corresponding to the data signal frequency carrier F2 (e.g., 40.68 MHz). A wireless power RX controller 816 may receive the output of the data signal filter 854 and the reference signal (REF), and may use the reference signal to decode the data signal. For example, the wireless power RX controller 816 may include a phase detection circuit for detection of a phase offset between the data signal and the reference signal. Based on the phase offset, the wireless power RX controller 816 may decode particular information that corresponds to the detected phase difference. Since the phase information contained in the power carrier is utilized, demodulation of phase information in the data carrier can be carried out in a simpler, cheaper, and more robust manner.

The wireless power RX controller 816 may also use the reference signal to generate a communication signal for transmission back to a wireless power transmitter 804 or other wireless power receivers 808. As illustrated, the wireless power RX controller 816 may generate a data signal based on the reference signal and output the data signal at a data signal frequency that is based on the reference signal. In some implementations, the wireless power RX controller 816 may be configured to generate a phase offset from the reference signal to encode data for transmission. The modulator 884 may generate the data signal output, which is received by the receiver multiplexer 842 through the data output amplifier 886. The receiver multiplexer 842 may be configured to transmit the data signal to the wireless power transmitter 804 and/or to other wireless power receivers 808. Since the data signal is generated based on the reference signal that is extracted from the received power signal, wireless power receivers 808 may be synchronized such that data transmissions from the wireless power receivers 808 do not destructively interfere with one another. For example, since each of a plurality of wireless power receivers 808 extracts the reference signal from the same signal received from the wireless power transmitter 808, each of the reference signals are in phase with each other. Signals transmitted by the wireless power receivers 808 (e.g., through phase modulation based on the reference signal) are not likely to destructively interfere with one another. As a result, multiple devices may transmit data simultaneously to a wireless power transmitter 804 without destructive interference. Further, the circuitry of the wireless power receiver 808 may be simplified relative to other wireless power receivers.

According to some implementations, communication protocols (such as a Dallas 1-wire protocol) may be utilized to provide explicit support for collision avoidance and arbitration based on a wired-OR scheme. Wired-OR schemes generally require a communication system to read 'no signal' when no devices are signaling, and read 'signal' when one or more devices are signaling. Conventionally, an on-off keyed communication system (e.g., utilizing amplitude-shift keying ASK) may be utilized. However, in conventional communication systems, since the phase of the carrier signal is not locked between different communication devices, destructive interference between signals transmitted by different devices may undesirably prevent reception of any of the signals. By phase locking all potential transmitters to the power carrier signal via the above method, destructive interference is prevented, and wireless wired-OR protocols can be implemented. According to the implementations discussed above with reference to FIG. 8, synchronized communication devices having simpler wired-OR protocol implementation and reduced cost relative to conventional devices.

Figure 9:
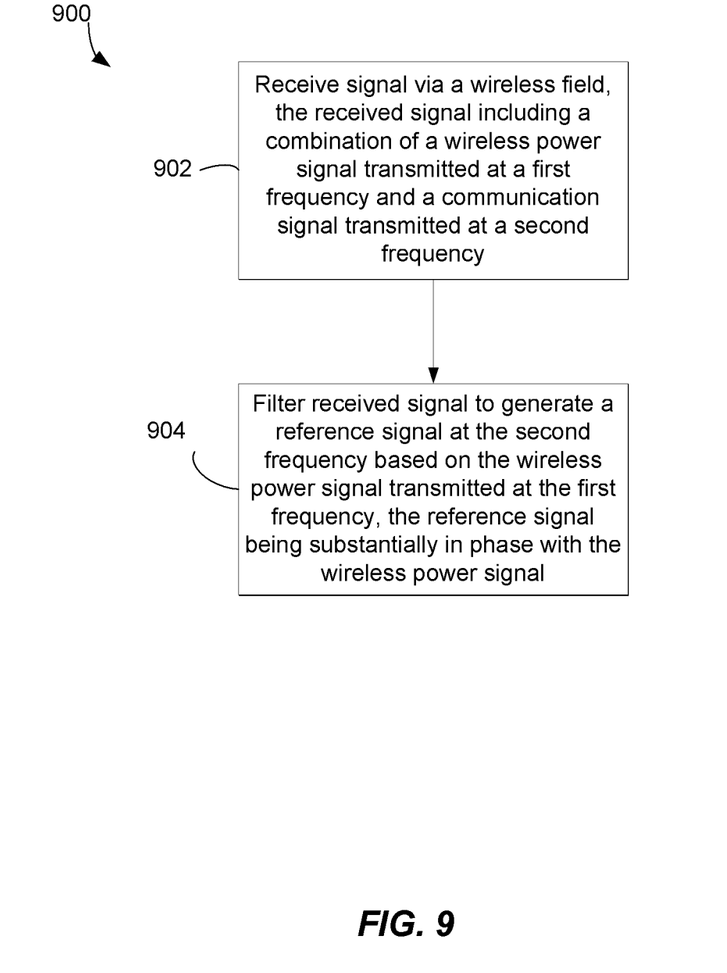
FIG. 9 is a flowchart of a method for receiving and determining a reference signal.

FIG. 9 illustrates a flowchart of a method of determining a reference signal according to some implementations. The method 900 includes receiving a signal via wireless field as illustrated by block 902. The received signal includes a combination of a wireless power signal transmitted at a first frequency (e.g., a power signal carrier F1) and a communication signal transmitted at a second frequency (e.g., a data signal carrier frequency F2). At block 904, the received signal may be filtered to generate a reference signal at the second frequency based on the wireless power signal transmitted at the first frequency, the reference signal being substantially in phase with the wireless power signal.

Figure 10:
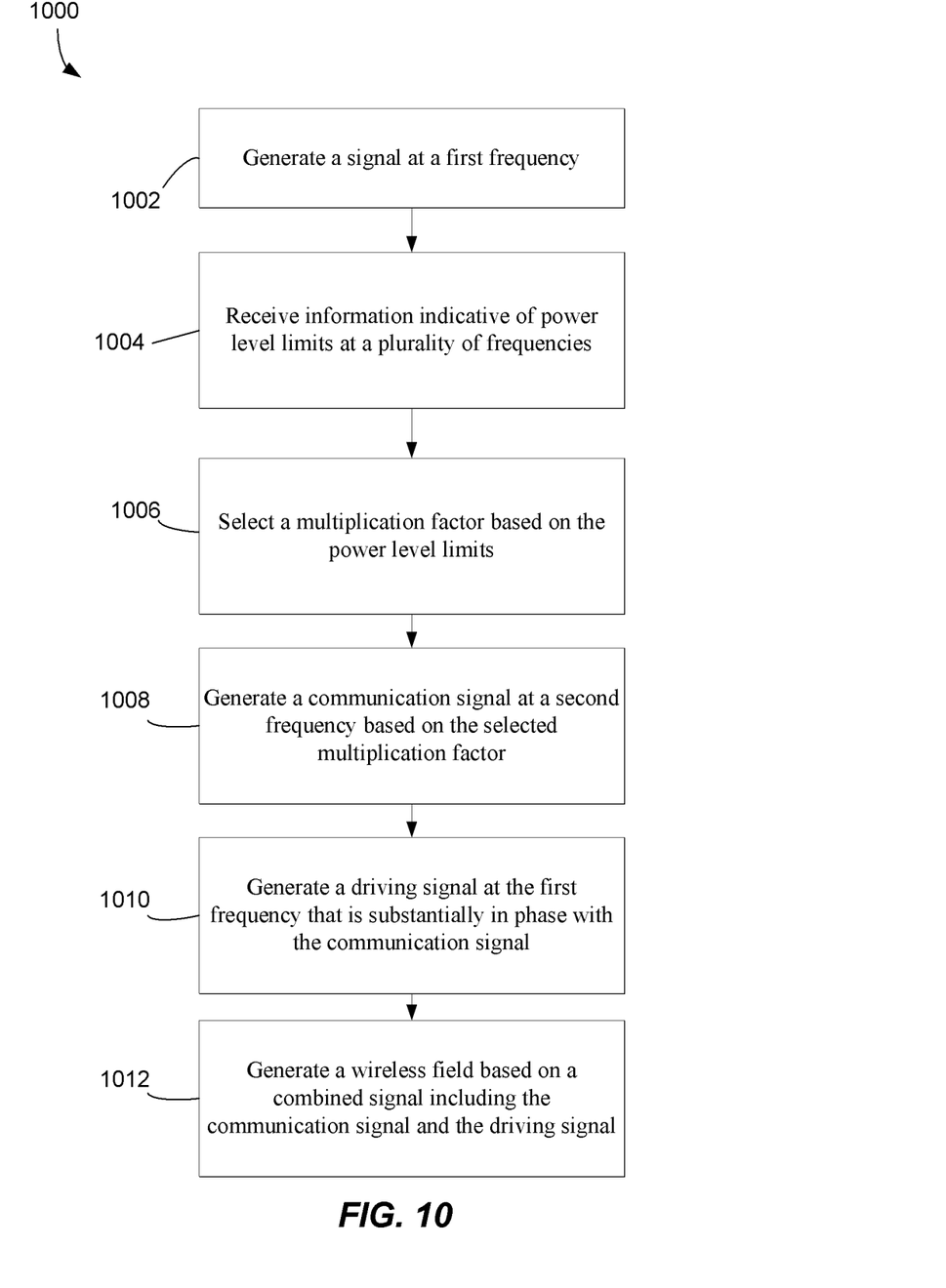
FIG. 10 is a flowchart of a method transmitting a power signal and communication signal.

FIG. 10 is a flowchart of a method transmitting a power signal and communication signal. As shown in FIG. 10, the method 1000 includes generating a signal at a first frequency (e.g., a power carrier frequency F1) as shown in block 1002. Information indicative of power level limits at a plurality of frequencies is received as shown in block 1004. A multiplication factor is selected based on the power level limits as shown in block 1006. For example, the multiplication factor may be selected to ensure that the combination of the power signal and a communication signal do not exceed any of the limits. A communication signal at a second frequency (e.g., a data signal carrier frequency F2) is generated based on the multiplication factor as shown in block 1008. A driving signal at the first frequency that is substantially in phase with the communication signal is generated at block 1010. A wireless field is generated based on a combined signal that includes the communication signal and the driving signal as shown in block 1012.

Figure 11:
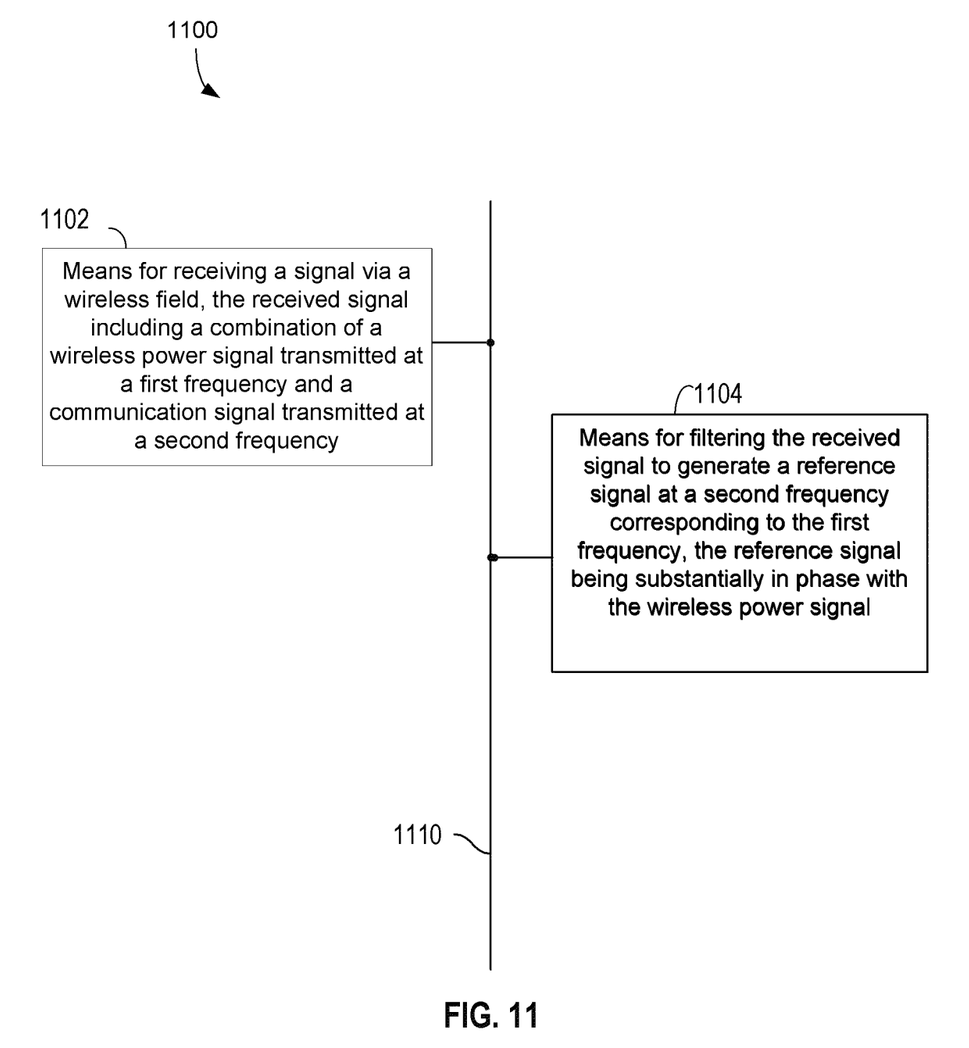
FIG. 11 is a functional block diagram of a wireless power transmitter, in accordance with some implementations.

FIG. 11 is a functional block diagram of a wireless power receiver 1100 in accordance with some implementations. Wireless power receiver 1100 includes means for receiving a signal via a wireless field as shown in block 1102. The received signal includes a combination of a wireless power signal transmitted at a first frequency and a communication signal transmitted at a second frequency. The wireless power receiver 1100 also includes means for filtering the received signal to generate a reference signal at a second frequency corresponding to the first frequency as shown in block 1104. The generated reference signal is substantially in phase with the wireless power signal. A communication and control bus 1110 may be used for communication between the various components of the wireless power receiver 1100 as shown in FIG. 11.

Figure 12:
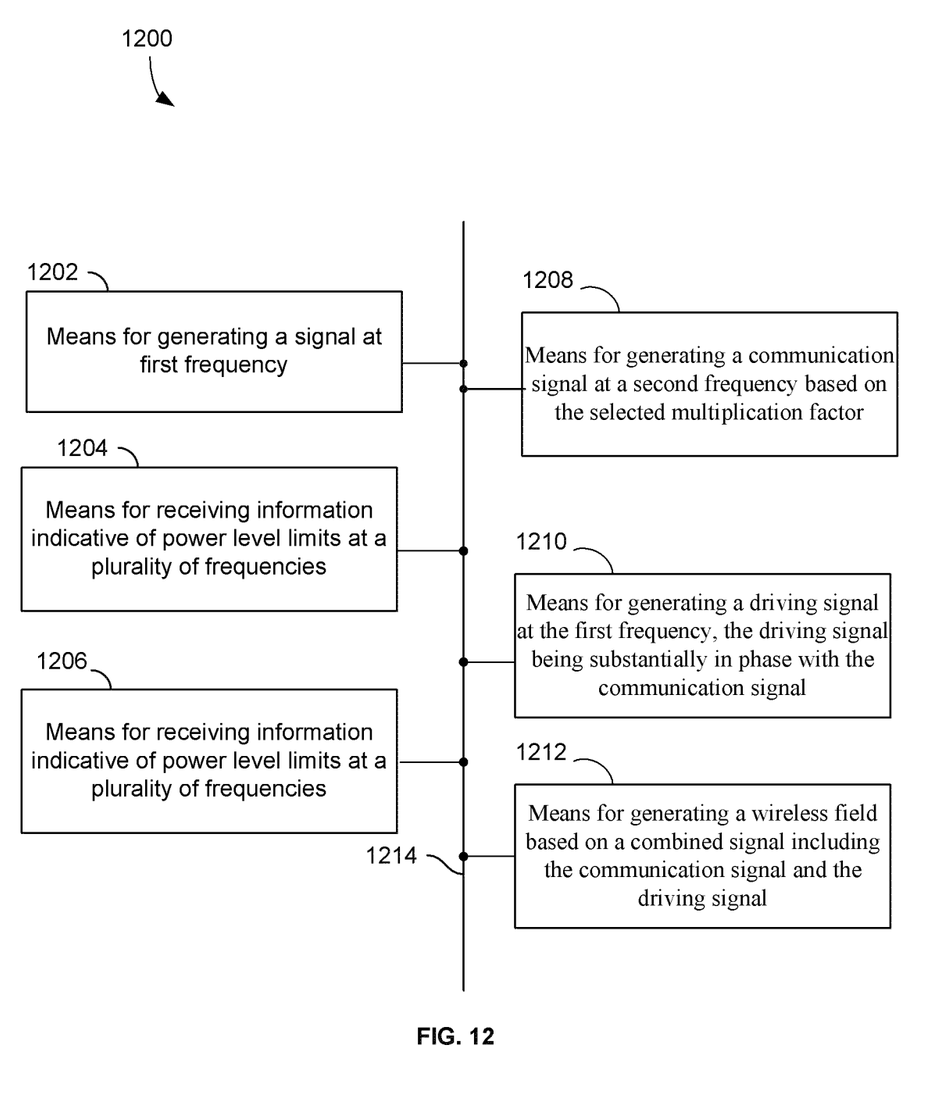
FIG. 12 is a functional block diagram of a wireless power receiver, in accordance with some implementations.

FIG. 12 is a functional block diagram of a wireless power transmitter 1200 in accordance with some implementations. Wireless power transmitter 1200 includes means for generating a signal at a first frequency as shown in block 1202, means for receiving information indicative of power level limits at a plurality of frequencies as shown in block 1204, means for selecting a multiplication factor based on the power level limits as shown in block 1206, means for generating a communication signal at a second frequency based on the selected multiplication factor as shown in block 1208, and means for generating a driving signal at the first frequency as shown in block 1210. The driving signal is substantially in phase with the communication signal. The wireless power transmitter 1200 also includes means for generating a wireless field based on a combined signal including the communication signal and the driving signal as shown in block 1212. A communication and control bus 1214 may be used for communication between the various components of the wireless power receiver 1200 as shown in FIG. 12.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, with reference to FIG. 11, the means for receiving the signal 1102 may correspond to a receive antenna 818 coupled to a multiplexer 842 as shown in FIG. 8. In some implementations, the antenna 818 may correspond to an antenna 350 having a structure as described with reference to FIG. 3. With returned reference to FIG. 11, the means for filtering 1104 may correspond to the reference signal filter 855 (e.g., a bandpass filter) as shown in FIG. 8.

With reference to FIGS. 8 and 12, the means for generating a signal at the first frequency 1202 may correspond to the oscillator 823, the means for receiving information 1204 and the means for selecting the multiplication factor 1206 may correspond to the TX controller 810, the means for generating a driving signal 1208 may correspond to the driving circuit 824 (e.g., a power amplifier), and the means for generating a wireless field 1212 may correspond to an antenna 814. In some implementations, the antenna 814 may correspond to an antenna 350 having a structure as described with reference to FIG. 3.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the invention.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular implementation of the invention. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A wireless power transmitter comprising:
a power source configured to generate a signal at a first frequency;

a controller configured to receive information indicative of power level limits at a plurality of frequencies, and select a multiplication factor based on the power level limits;

a communication signal generator coupled to the power source and configured to receive the signal at the first frequency and generate a communication signal at a second frequency based on the selected multiplication factor;

a driver coupled to the power source and configured to receive the signal at the first frequency and generate a driving signal at the first frequency, the driving signal being substantially in phase with the communication signal; and a transmit circuit configured to receive a combined signal including the communication signal and the driving signal to generate a wireless field.

2. The wireless power transmitter of claim 1, wherein the communication signal generator includes a multiplier configured to generate the reference signal at the second frequency as an integer multiple of the first frequency based on the multiplication factor.

3. The wireless power transmitter of claim 1, wherein the controller is configured to generate a data signal, and wherein the communication signal generator further comprises a modulator configured to receive the data signal and modulate the reference signal based on the received data signal to generate the communication signal.

4. The wireless power transmitter of claim 1, further comprising a multiplexer configured to receive the communication signal and the driving signal to generate the combined signal.

5. The wireless power transmitter of claim 1, wherein the transmit circuit comprises a transmit antenna, and wherein the transmit antenna includes a transmit coil.

6. The wireless power transmitter of claim 1, wherein the transmit antenna is resonant at the first frequency.

7. The wireless power transmitter of claim 1, wherein the first frequency is about 6.78 MHz, and wherein the second frequency is about 40.72 MHz.

8. The wireless power transmitter of claim 1, wherein the controller is configured to dynamically vary the multiplication factor to encode additional information.

9. The wireless power transmitter of claim 1, wherein the controller is configured to dynamically vary the multiplication factor to increase throughput of the communication signal.

10. The wireless power transmitter of claim 1, wherein the multiplication factor is an integer.

11. A method of transferring power via a wireless field comprising:
generating a signal at a first frequency;
receiving information indicative of power level limits at a plurality of frequencies;
selecting a multiplication factor based on the power level limits;
generating a communication signal at a second frequency based on the selected multiplication factor;
generating a driving signal at the first frequency, the driving signal being substantially in phase with the communication signal; and
generating the wireless field based on a combined signal including the communication signal and the driving signal.

12. The method of claim 11, wherein the multiplication factor is an integer.

13. The method of claim 11, further comprising generating a data signal, and modulating the reference signal based on the data signal to generate the communication signal.

14. The method of claim 11, further comprising encoding information by varying the multiplication factor.

15. The method of claim 11, wherein the first frequency is about 6.78 MHz, and wherein the second frequency is about 40.72 MHz.

16. The method of claim 11, further comprising dynamically varying the multiplication factor to increase throughput of the data signal.

17. An apparatus for transferring power via a wireless field comprising:
means for generating a signal at a first frequency;
means for receiving information indicative of power level limits at a plurality of frequencies;
means for selecting a multiplication factor based on the power level limits;
means for generating a communication signal at a second frequency based on the selected multiplication factor;
means for generating a driving signal at the first frequency, the driving signal being substantially in phase with the communication signal; and
means for generating a wireless field based on a combined signal including the communication signal and the driving signal.

18. The apparatus of claim 17, wherein the means for generating a signal at the first frequency comprises an oscillator, the means for receiving information comprises a controller, the means for selecting the multiplication factor comprises a controller, the means for generating a driving signal comprises a power amplifier, and the means for generating a wireless field comprises an antenna.

19. The apparatus of claim 17, wherein the multiplication factor is an integer.

20. The apparatus of claim 17, further comprising means for generating a data signal, and means for modulating the reference signal based on the data signal to generate the communication signal.

* * * * *